(12) United States Patent
Coxey

(10) Patent No.: US 10,426,149 B1
(45) Date of Patent: Oct. 1, 2019

(54) METHODS AND APPARATUS FOR ENHANCED AUDIBLE FISHING EQUIPMENT WITH HEAT SHRINK

(71) Applicant: Robert Coxey, Jacksonville, FL (US)

(72) Inventor: Robert Coxey, Jacksonville, FL (US)

( * ) Notice: Subject to any disclaimer, the term of this patent is extended or adjusted under 35 U.S.C. 154(b) by 0 days.

(21) Appl. No.: 16/433,723

(22) Filed: Jun. 6, 2019

Related U.S. Application Data

(63) Continuation-in-part of application No. 16/156,823, filed on Oct. 10, 2018, now Pat. No. 10,357,025.

(60) Provisional application No. 62/570,513, filed on Oct. 10, 2017, provisional application No. 62/681,147, filed on Jun. 6, 2018, provisional application No. 62/681,180, filed on Jun. 6, 2018.

(51) Int. Cl.
  *A01K 85/01* (2006.01)
  *A01K 85/14* (2006.01)

(52) U.S. Cl.
  CPC .............. *A01K 85/01* (2013.01); *A01K 85/14* (2013.01)

(58) Field of Classification Search
  CPC .................................. A01K 85/01; A01K 85/14
  USPC ................................................ 43/42.5, 42.13
  See application file for complete search history.

(56) References Cited

U.S. PATENT DOCUMENTS

| | | | |
|---|---|---|---|
| 1,600,618 A | 9/1926 | Bentley | |
| 1,636,904 A | 7/1927 | Elwood | |
| 1,698,193 A | 1/1929 | Geer | |
| 1,867,555 A | 7/1932 | Hildebrandt | |
| 2,131,858 A | 10/1938 | Ledrich | |
| 2,212,294 A | 8/1940 | Larzelere | |
| 2,674,823 A | 4/1954 | Gellings | |
| 2,823,484 A | 2/1958 | Maurice | |
| 3,935,660 A * | 2/1976 | Plew | A01K 85/01 43/42.31 |
| 4,730,410 A | 3/1988 | Sobieniak | |
| 4,888,909 A | 12/1989 | Adams | |
| 5,001,856 A * | 3/1991 | Gentry | A01K 85/01 43/42.31 |
| 5,113,606 A | 5/1992 | Rinker | |
| 5,605,004 A | 2/1997 | Boullt et al. | |
| 5,647,163 A | 7/1997 | Gomey | |
| 5,887,379 A | 3/1999 | Lockhart | |
| 6,158,162 A | 12/2000 | Loniello | |
| 7,467,491 B1 | 12/2008 | Slocum | |
| 8,042,298 B1 | 10/2011 | Yonekura et al. | |

(Continued)

*Primary Examiner* — Christopher P Ellis
(74) *Attorney, Agent, or Firm* — Joseph P. Kincart; Rogers Towers, P.A.

(57) ABSTRACT

The present disclosure provides an Audible Enhanced Fishing Lure with desirable waterproofing and hydrodynamic properties. The Audible Enhanced Fishing Lure has a sound generator, or other noisemaking device, fixed by a waterproof means to the body of the device, combined with reflective material to maximize the device's attractiveness to fish. The heat shrink process itself ensures smooth glide through the water and waterproofing of the elements of the lure. The present disclosure also provides apparatus and method for manufacturing a weighted popping flotation device, which has desirable water-resistance properties, a plurality of audible generators to attract fish, and is weighted precisely to ensure ease of casting into the wind. In some embodiments, the weighted popping flotation device utilizes heat shrink tubing to prevent snagging of the fishing line when dragged through water.

20 Claims, 13 Drawing Sheets

(56) References Cited

U.S. PATENT DOCUMENTS

| | | | | |
|---|---|---|---|---|
| 9,032,660 | B2* | 5/2015 | Vanacore, Jr. | A01K 85/01 |
| | | | | 43/26.2 |
| 10,136,623 | B2* | 11/2018 | Crain | A01K 85/01 |
| 2002/0148155 | A1 | 10/2002 | Pasley | |
| 2003/0145510 | A1 | 8/2003 | Kohigashi et al. | |
| 2004/0079022 | A1 | 4/2004 | Owen et al. | |
| 2006/0000138 | A1 | 1/2006 | Druk | |
| 2006/0242887 | A1 | 11/2006 | Toman | |
| 2009/0211144 | A1 | 8/2009 | Murphy | |
| 2010/0263258 | A1 | 10/2010 | Hinz | |
| 2010/0281756 | A1 | 11/2010 | Lau | |
| 2011/0119985 | A1 | 5/2011 | Stier | |
| 2011/0247260 | A1 | 10/2011 | Schwartz | |
| 2014/0059916 | A1* | 3/2014 | Culver | A01K 85/00 |
| | | | | 43/42.02 |
| 2014/0150329 | A1* | 6/2014 | Waldroup | A01K 85/00 |
| | | | | 43/42.25 |
| 2017/0347635 | A1 | 12/2017 | Sandefur | |
| 2019/0216067 | A1* | 7/2019 | Naig | A01K 85/01 |

* cited by examiner

300 — POSITION A HOOK ON A LURE SPOON WITH A HOLE AT A PROXIMATE END, A HOLE A DISTAL END, AND A HOLE AT A MID-PORTION OF THE SPOON

301 — FIXEDLY ATTACH THE HOOK TO THE HOLE AT THE MIDPORTION OF THE LURE SPOON

302 — ATTACH A PROXIMATE END OF A SWIVEL TO THE HOLE AT THE DISTAL END OF THE SPOON

303 — FIXEDLY ATTACH A RATTLE ASSEMBLY TO A PORTION OF THE SHANK OF THE HOOK PROXIMATE TO THE HOLE AT MIDPORTION VIA SHRINK TUBING

304 — FIXEDLY ATTACH THE SHANK OF THE HOOK TO THE SWIVEL VIA SHRINK TUBING

305 — ATTACH A BLADE TO A DISTAL END OF THE SWIVEL

FIG. 3

METHODS AND APPARATUS FOR ENHANCED AUDIBLE FISHING EQUIPMENT WITH HEAT SHRINK

CROSS-REFERENCE TO RELATED APPLICATION

The present application is a continuation in part to application Ser. No. 16/156,823, filed on Oct. 10, 2018 and entitled "Spinning Fishing Lure with Bead Elements with Auditory Attractant Characteristics", which in turn claims priority to U.S. Provisional application 62/570,513, filed on Oct. 10, 2017 entitled "Spinning Fishing Lure with Bead Elements with Auditory Attractant Characteristics". The present application also claims priority to U.S. Provisional App. Nos. 62/681,147 (filed on Jun. 6, 2018, and entitled Audible Enhanced Fishing Lure) and 62/681,180 (filed on Jun. 6, 2019, and entitled Methods and Apparatus for a Weighted Popping Flotation Device with Audible Attraction). The contents of each of the above referenced applications are expressly incorporated herein by reference and relied upon.

FIELD OF THE DISCLOSURE

The present disclosure relates to methods and apparatus for enhanced audible fishing equipment; namely, an audible enhanced fishing lure and a weighted popping flotation device with audible attraction.

BACKGROUND OF THE DISCLOSURE

Fishing is an activity enjoyed by people around the world for providing food and as a sporting activity. An ability to configure a fishing lure to attract fish to a hook without bait can provide an economical and easy method of fishing. Certain types of lures can work better at different locations or different times, but in general for those different types of lures there are certain common aspects that can provide advantages. It is desirable that a lure is reusable and stable so that the lure does not have to be adjusted after each casting. It can also be desirable for the device to be weighted precisely to ensure ease of casting in windy conditions.

Fish are also attracted to movement, sound, and light. Accordingly, the best lures may include components that can move while reflecting light and making certain noises. These components are often temporarily affixed to lures, as many methods of affixation are not waterproof.

SUMMARY OF THE DISCLOSURE

Accordingly, the present invention provides methods and apparatus for enhanced audible fishing equipment. In particular, the present invention considers an Audible Enhanced Fishing Lure, comprising a reflective spoon lure, a hook fixably attached to the spoon lure, and a rattle fixably attached to the shank of the hook by a first heat shrink tube.

In some embodiments, the Audible Enhanced Fishing Lure further comprises a reflective blade, and a swivel that movably attaches the blade to the spoon lure. In still other embodiments, the Audible Enhanced Fishing Lure further comprises a second heat shrink tube that fixably binds the swivel to the hook. The present disclosure also describes a weighted popping flotation device with desirable audible quality, waterproofing, and wind-resistant properties.

One general aspect includes an audibly enhanced fishing lure with a lure spoon having a convex side, a concave side, a first hole extends through the convex side to the concave surface side at a proximate end of the lure spoon. A second hole extends through the convex side to the concave side at a mid-portion of the lure spoon. A third hole extends through the convex side to the concave side at a distal end of the lure spoon. A hook including a shank, a point and a fastening area fixedly attached to the hole at the mid-portion of the lure spoon with a fastener. An audible generator is fixedly attached to the shank of the hook via a first heat shrink tube. A swivel having a proximate end and a distal end, is attached with the proximate end of the swivel at the distal end of the lure spoon. A second shrink tube is fixedly attaching the shank of the hook to the swivel at a portion of the hook positioned beyond the distal end of the lure spoon, thereby fixedly positioning the hook to extend from the hole at the mid-portion of the spoon to beyond the distal end of the spoon.

Implementations may include one or more of the following features. The audibly enhanced fishing lure where the fastener includes a rivet. The audibly enhanced fishing lure where the lure spoon additionally includes a reflective surface on one or both of the convex side and the concave side. The audibly enhanced fishing lure further including a reflective blade attached to the distal end of the swivel beyond the shank of the hook.

One general aspect includes a method for assembling an audibly enhanced fishing lure, the method including the steps of: positioning a hook including a fastening area a barb and a shank on a concave side of a lure spoon, where the lure spoon additionally includes a lure spoon including a convex side, a concave side, a hole through the convex side to the concave surface side at a proximate end of the lure spoon, a hole through the convex side to the concave side at a mid-portion of the lure spoon, and a hole through the convex side to the concave side at a distal end of the lure spoon, an audible generator fixedly attached to the shank of the hook via a first heat shrink tube, a swivel with a proximate end and a distal end, the proximate end of the swivel attached to the hole at the distal end of the lure spoon, and a second shrink tube fixedly attaching the shank of the hook to the swivel at a position of the hook beyond the distal end of the lure spoon thereby fixed positioning the hook to extend from the hole at the mid-portion of the spoon to beyond the distal end of the spoon; fixedly attaching the hook to the hole at the mid-portion of the lure spoon; placing an audible generator on the shank of the hook; placing a first length of heat shrink tubing, in an expanded state, over the shank and the audible generator; applying sufficient heat to the first length of heat shrink tubing to cause a diameter of first length of heat shrink tubing to reduce and fixedly attach the audible generator to the shank of the hook; movably attaching a swivel including a proximate end and distal end to the distal end of the spoon; and positioning a second length of heat shrink tubing, in an expanded state over a portion of the shank of the hook and the swivel; and applying sufficient heat to the second length of heat shrink tubing to cause a diameter of the second length of heat shrink tubing to reduce and fixedly attach the shank of the lure to the swivel.

Implementations may include a method where the length of a hook from the proximate end to the distal end is between approximately 50% and approximately 200% of the length of the lure spoon; the method where the hook further includes an attachment loop. Implementations of the described techniques may include hardware, a method or process, or computer software on a computer-accessible medium.

Additional embodiments include a method of using various embodiments of lures described herein including placing a lure as disclosed herein a body of water containing fish; moving the lure through the water with a line fixedly attached to the proximate end of the lure spoon; generating an underwater audible sound with the audible generator; and generating a reflected pattern of light.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

FIG. 3 illustrates exemplary steps that may be performed in making an Audible Enhanced Fishing Lure.

DETAILED DESCRIPTION

The present disclosure provides generally for enhanced audible fishing equipment with heat shrink. In one aspect, according to the present disclosure, an Audible Enhanced Fishing Lure with controllable audible qualities. The audible qualities are imparted to the fishing lure via removably fixed attachment of a sound making device to an aspect of the fishing lure with shrink tubing. A rattle is attached to a spoon lure by means of heat shrink tubing.

In another aspect, the present disclosure provides a weighted popping flotation device with an internal audible generator. According to the present disclosure, a weighted popping flotation device has desirable water-resistance properties, a plurality of audible generators to attract fish, and is weighted precisely to ensure ease of casting into the wind. In some embodiments, the weighted popping flotation device utilizes heat shrink tubing to prevent snagging of the fishing line when dragged through water.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

Heat shrink tubing, as used herein refers to a shrinkable plastic tube used to bind a plurality of distinct components together. A person skilled in the art will appreciate that there are many varieties of heat shrink tubing, with various compositions. In the present disclosure, the preferred composition is polyvinyl chloride (known in the art as PVC), with or without any additives such as colorants or stabilizers, though any other thermoplastic material suitable for underwater applications is also appropriate.

Figure 1:
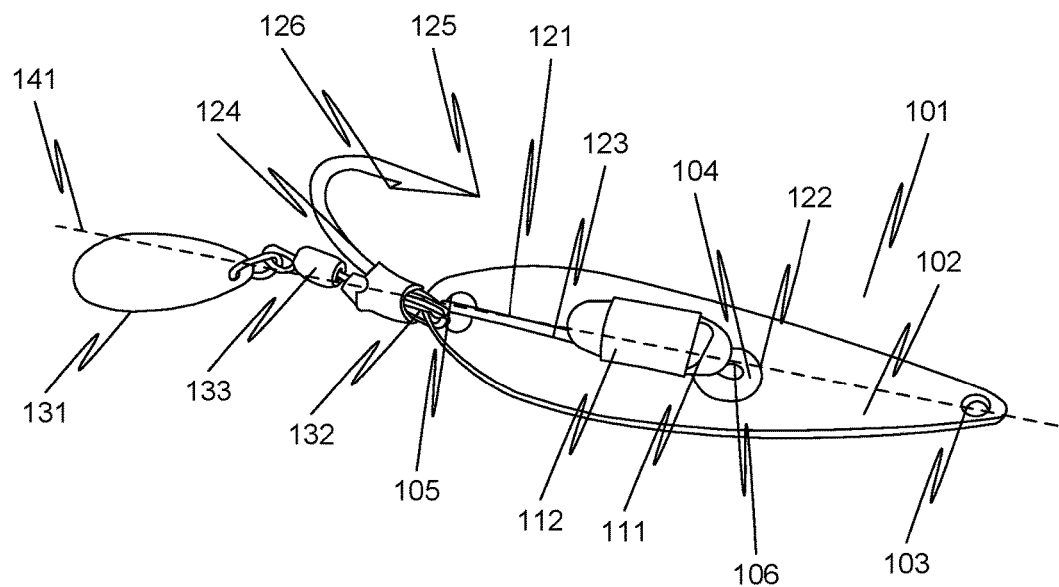
FIG. 1 illustrates an exemplary embodiment of the Audible Enhanced Fishing Lure.

Referring now to FIG. 1, an exemplary embodiment of the Audible Enhanced Fishing Lure 101 is shown. The Audible Enhanced Fishing Lure broadly comprises interrelated aspects, including: a visual attraction portion, such as a spoon 102; an audible generator 111; a hook 121; and in some embodiments, a secondary visual attraction portion, such as a blade 131. The respective aspects will be of a relative size and weight suitable for arrangement according to the concepts presented herein. The hook 121 rests generally near the geometrical center of the spoon 102, and forms a central radial axis for the Audible Enhanced Fishing Lure 101 along the hook axis 141.

As used herein, an audible generator 111 is a device that produces a sound wave that is ascertainable by a fish. An audible generator may include, by way of non-limiting example, one or more of: a mechanical rattle, beads within a casing with enough area within the casing to strike one or both of other beads and the casing, beads that are axially strung and may strike each other, or a strike plate, a piezoelectric device, and an electric sound device.

The spoon 102 is formed of a rigid or semi rigid material and preferable includes a surface capable of reflecting light, such as a highly reflective metal. The surface may be a smooth mirrored surface or a textured surface, such as concave divots. Preferably the spoon comprises a concave side that in some embodiments focuses light, and a convex side that generally scatters light. The spoon 102 further comprises a proximal hole 103, for connection to a fishing rod or similar device, and a distal hole 105. In exemplary embodiments, the spoon 102 also has a central hole 106. The central hole 106 is generally at or near the x- and y-axis center of the spoon 102.

In exemplary embodiments, the spoon 102 comprises an eye rivet 104 situated generally near the geometrical center of the spoon 102, and in some embodiments, the rivet 104 encompasses the central hole 106. The rivet 104 is made of a highly reflective metal that is generally the same or near the same color as the spoon, and in some embodiments is the same metal as the composition of the spoon 102.

The Audible Enhanced Fishing Lure 101 further comprises an audible generator 113, which is fixably attached to the concave side of the spoon 102 and situated generally near the geometrical center of the spoon. In some embodiments, an audible generator 111 includes a casing including a cylindrical casing 111 and one or more strikers 112 within the casing 111. The cylindrical casing 111 is closed at both ends 114, and encloses at least one striker 112 comprising a moveable insert, such as metallic ball bearing. The at least one striker 112 is roughly spherical, and has a diameter slightly smaller than the base diameter of the casing comprising a cylindrical casing 111. The at least one striker 112 can move freely within the tube to create a rattling sound when it impacts a closed end of the cylindrical casing 111 or another striker 112 such as another metallic ball bearing. The radial axis of the tube is approximately aligned with the hook axis 141 of the spoon.

Figure 2:
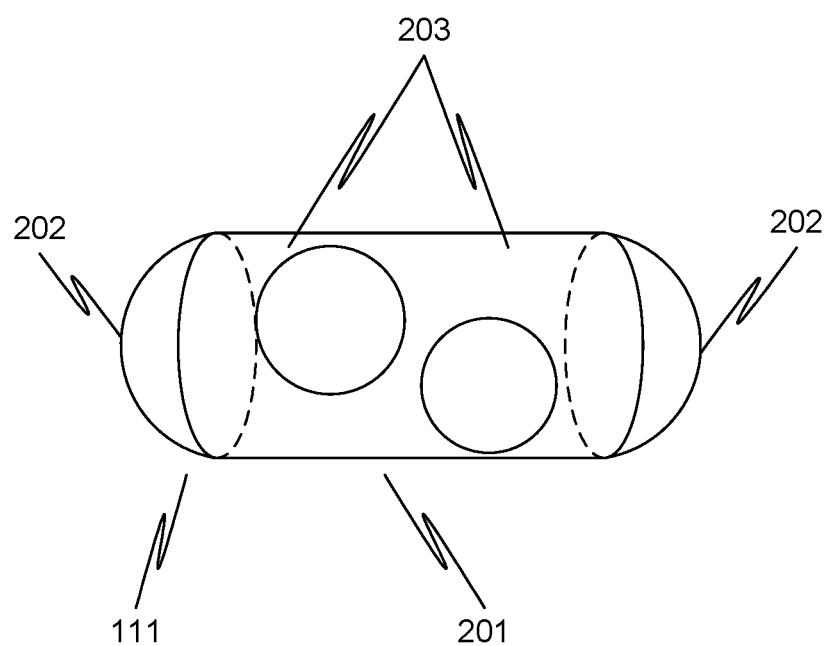
FIG. 2 illustrates an exemplary embodiment of the rattle fixably attached to the spoon lure.
Figure 4A:
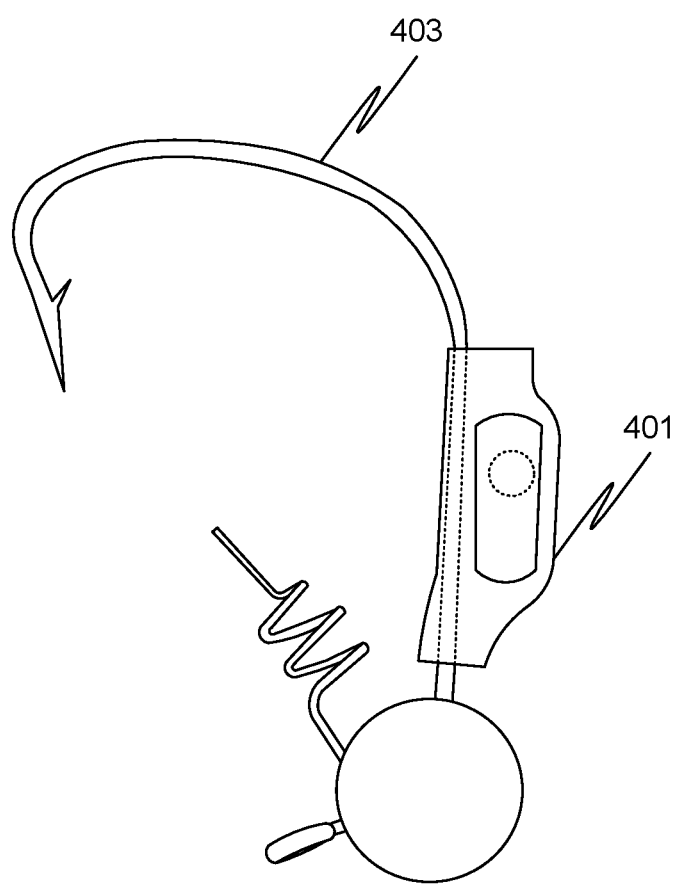
FIGS. 4A-4F illustrate various views and alternative embodiments of an Audible Enhanced Fishing Lure.
Figure 4B:
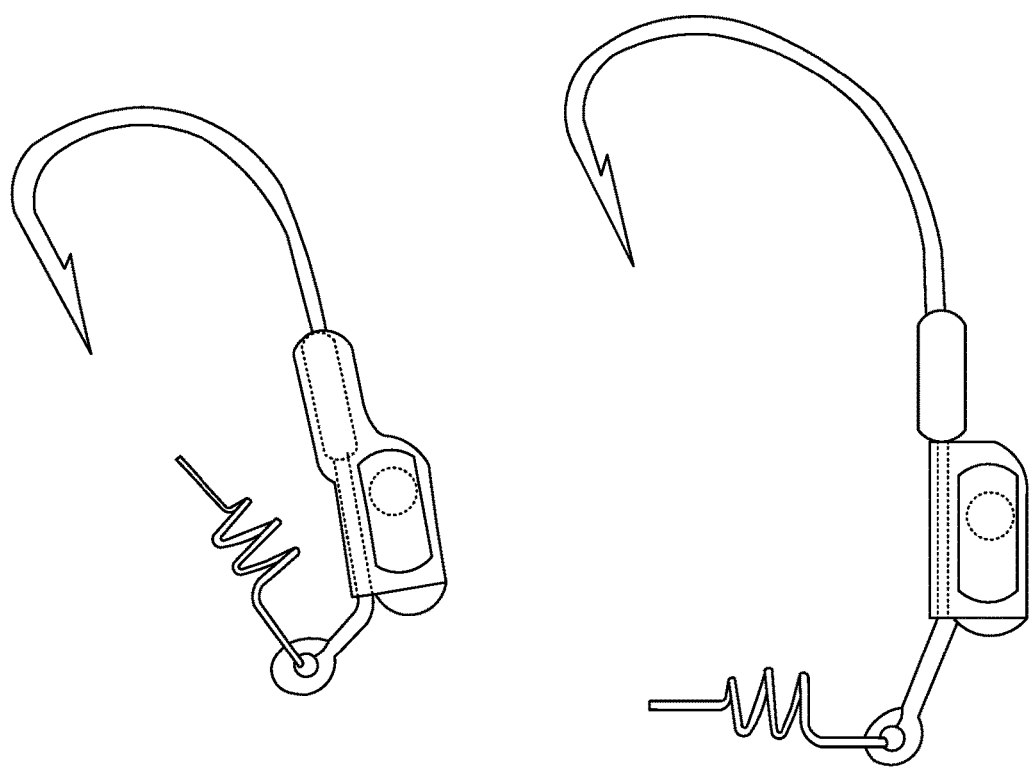
Figure 4C:
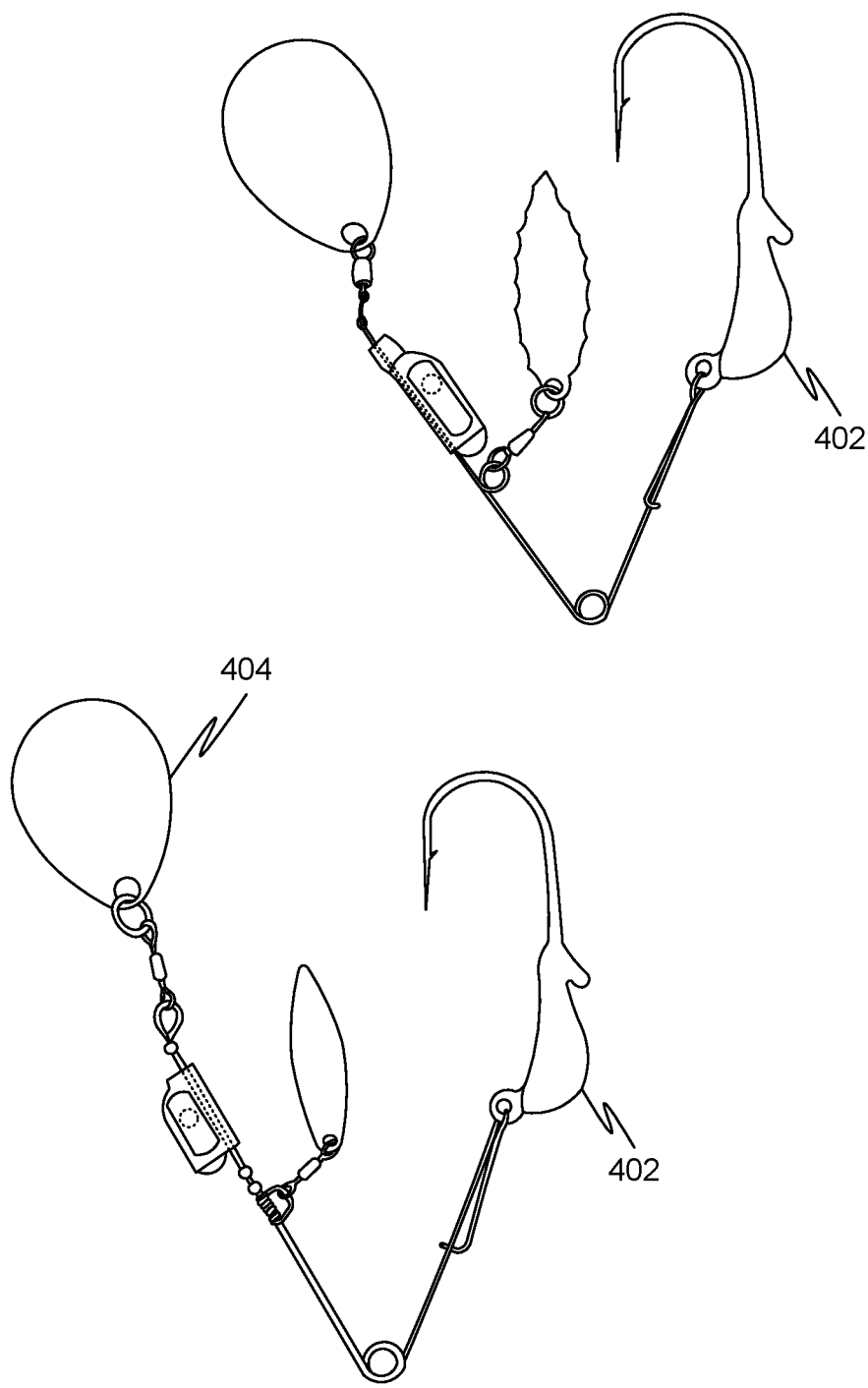
Figure 4D:
Figure 4E:
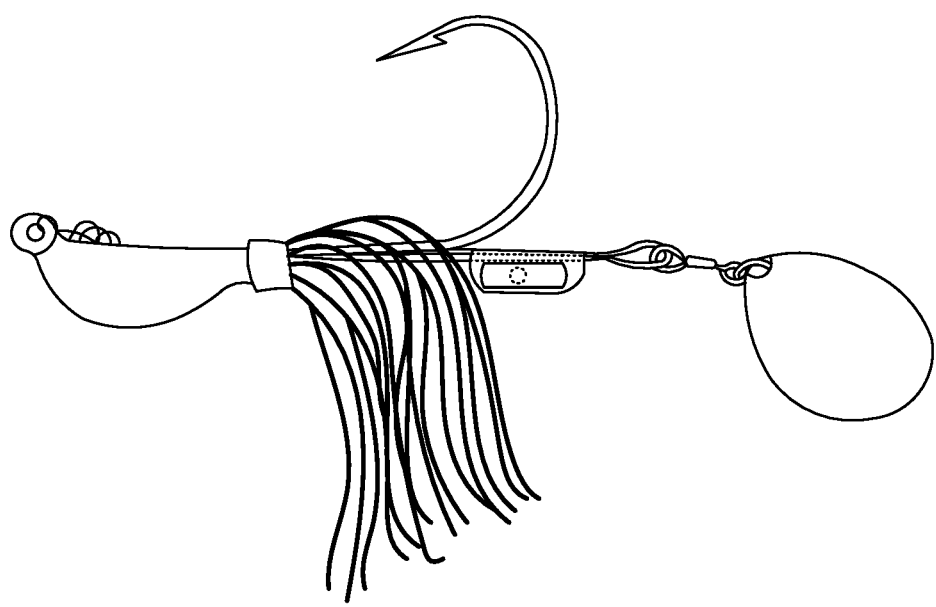
Figure 4F:
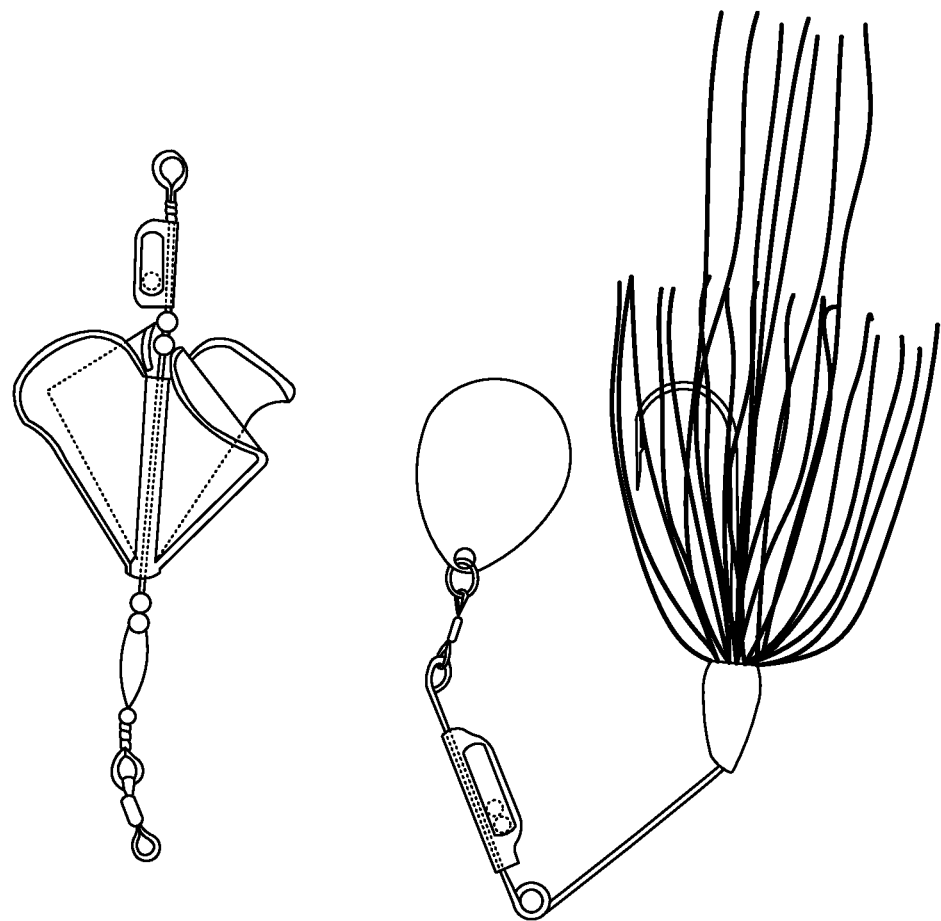

Referring now to FIG. 2, in some embodiments, an audible generator 113 comprises a hollow shell of a bullet-shaped external contour with an integral cylindrical tube 201 extending therethrough. In some embodiments, one end of the cylindrical tube rests on the rivet 104. The cylindrical tube is closed at both ends 202, and encloses at least one moveable insert, such as metallic ball bearing 203. The at least one metallic ball bearing 203 is roughly spherical, and has a diameter slightly smaller than the base diameter of the cylindrical tube 201. The at least one metallic ball bearing 203 can move freely within the tube to create a rattling sound when it impacts a closed end of the cylindrical tube 202 or another metallic ball bearing 203. The radial axis of the tube is approximately aligned with the hook axis 141 of the spoon.

Referring again to FIG. 1, the Audible Enhanced Fishing Lure 101 further comprises a hook 121. The hook 121 includes an eye 122, shank 123, bend 124, and point 125. In some embodiments, the eye 122 is a generally circular loop, and rests fixably between the rivet 104 and the central hole 106, to allow a device like a fishing line to pass easily through the central hole 106, rivet 104, and eye 122. The shank 123 may be straight and metallic and may connect the eye 122 to the bend 124. The shank 123 may pass through the axis of symmetry of the spoon 102 to define the hook axis 141. The part of the bend 124 closest to the eye 122 may begin a transition from the straight shank 123 to the curved bend 124 of the hook. In some embodiments, this part of the bend 124 passes through the distal hole 105 of the spoon 102. In other embodiments, the part of the shank 123 furthest from the eye 122 passes through the distal hole 105 of the spoon 102. A person skilled in the art will understand that the hook 121 passes through the distal hole 105 of the spoon 102. The bend 124 of the hook passes in a U-shape generally along the hook axis toward the blade 131, curving upwards along the hook axis 141. While one end of the U-shape passes through the distal hole 105, the other end, on which the point 125 sits, lies parallel to the distal hole 105, near the parabolic focal point of the spoon 102. The point 125 is the sharp end of the hook 121, designed to pierce through fish and aquatic obstacles. In other embodiments, the point 125 may rest beneath the spoon 102. In some embodiments, the hook 121 further comprises a barb 126, a projection extending backwards from the point 125, which secures the fish from unhooking.

The audible generator 111 may be fixedly attached to the hook 121 on the shank 123 by a first heat shrink tube 112. The first heat shrink tube 112 is generally cylindrical, and due to the thermoplastic shrinking process that binds the first heat shrink tube 112 to the hook 121 and audible generator 111, may have a base diameter approximately identical in side to the sum of the base diameter of the rattle cylindrical tube 201 and the thickness of the shank 123, which may make separation of the audible generator 111 from the hook 121 difficult. This is desirable both for fishing applications, as the sound of the audible generator 111 attracts the fish precisely to the hook 121, and for environmental purposes, as the audible generator 111 is generally small and poses a choking hazard to wildlife. Additionally, as described earlier, the composition of the heat shrink tube 112 may be water resistant, thus slowing any degradation of the binding between the hook 121 and the audible generator 111. In some embodiments, the first heat shrink tube 112 has a similar color to that of the spoon 102.

In some embodiments, the Audible Enhanced Fishing Lure further comprises a blade 131. The blade 131 may be highly reflective, and in some embodiments, is made of the same metal as the spoon 102. The blade 131 may be movably attached to the spoon 102 by a swivel 132. In some embodiments, the swivel comprises a connector attached to the blade 131 and clasped through the distal hole 105 of the spoon 102. The blade 131 can freely move about the hook axis 141. The swivel 132 is bound fixably to the bend 124 of the hook 121 by a second heat shrink tube 133. The second heat shrink tube is generally composed of the same matter as the first heat shrink tube 112, and is shrunk to snugly bind the bend 124 and the swivel 132.

Referring now to FIG. 3, exemplary steps that may be used for assembling an Audible Enhanced Fishing Lure according to the present invention are illustrated. At step 300, a hook of appropriate size ratio to a lure spoon is positioned on the lure spoon. The spoon will include a hole at the proximate end of the spoon, a hole at a mid-portion of the spoon and a hole at a distal end of the spoon. An appropriate size ratio may include, for example, a hook of between about 50% of the length of the spoon to about 200% of the length of the spoon. At 301, an attachment loop on the hook is fixedly attached to the hole at the mid-portion of the spoon. Attachment may be accomplished for example via a rivet, a bolt, a weld, solder or other mechanical attachment.

At step 302, a proximate end of a swivel is attached to the hope at the distal end of the spoon. At step 303, a rattle assembly is fixedly attached to the shank of the hook. In some preferable embodiments, the rattle is attached to the shank of the hook proximate to the hole at the mid-portion of the spoon via shrink tubing encircling the rattle and the shank of the hook. In some embodiments, an adhesive and/or sealant may be used in addition to the shrink tubing to fixedly attach the rattle to the shank of the hook.

At step 304, the shank of the hook is attached to the swivel via shrink tubing. An adhesive and/or sealant may also be used to supplement the binding capability of the shrink tubing holding the shank of the hook to the swivel.

At step 305, in some embodiments, a blade may be attached to a distal end of the swivel. In preferred embodiments, the blade is positioned to move proximate to a point at the end of the hook. The blade acts as a visual attraction for a game fish to the point of the hook.

Referring now to FIGS. 4A-4F, various embodiments of the present invention are illustrated. As illustrated, an audible generator 401 may be placed in various positions in relation to a weighted portion 402, a hook 403, a spoon 404 or other aspect of fishing tackle.

Weighted Popping Flotation Device

Figure 5:
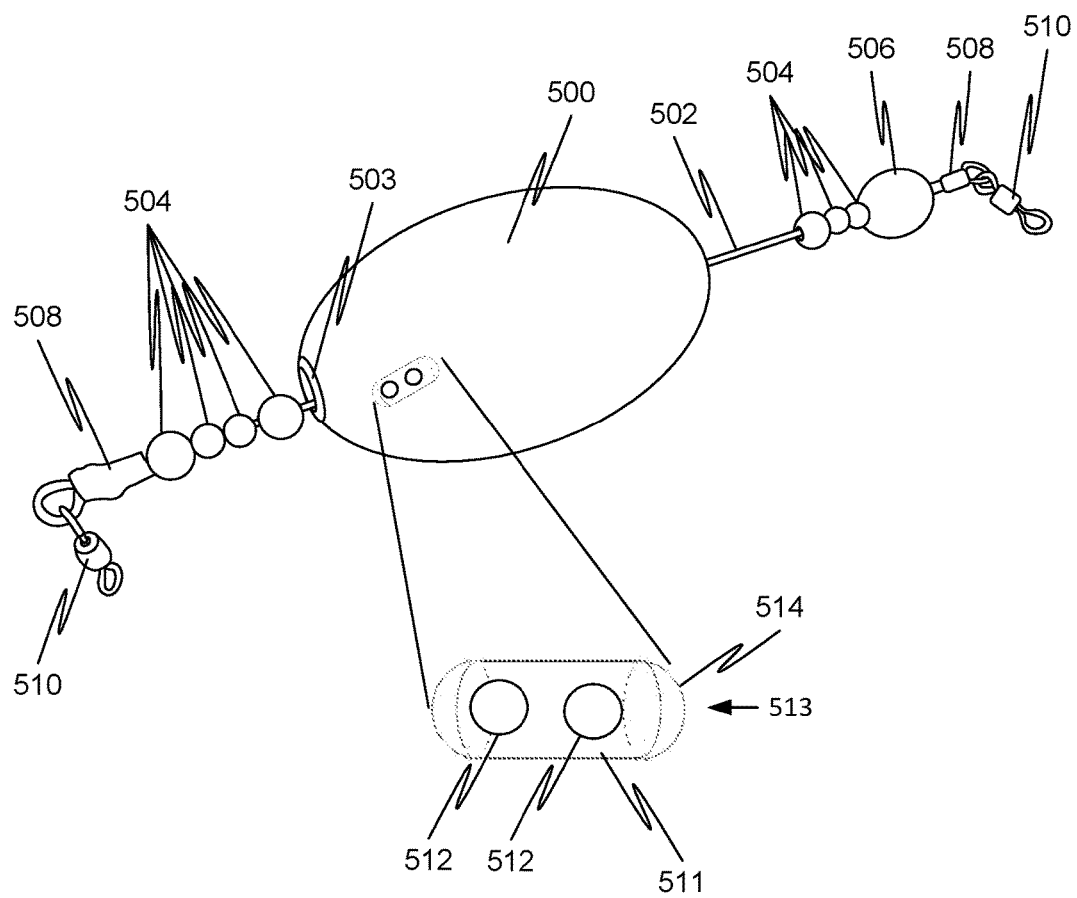
FIG. 5 illustrates an exemplary embodiment of a weighted popping floatation device.

Referring now to FIG. 5, an exemplary embodiment of the weighted popping flotation device is shown. The weighted popping flotation device broadly comprises a cork 500, popping line 502, and a one or more audible generators 504 and 506. Audible generators 504, 506, 513 may include a casing 511 for generating a resonant sound when percussed by a striker 512. The casing 511 will contain the striker within a confined area sufficient to allow movement of the striker 512 within the casing. A striker 512 may include, by way of non-limiting example: a bead, a spheroid, a cylinder and/or a weighted end of a tensile spring. Movement of the audible generator 504, 506 causes the striker 512 to move against the casing 511 and create a sound wave. Aspects of one or more of: the size of the casing 511; the shape of the casing, the material of the casing 511, the thickness of casing 511 walls, variations in thickness of casing 511 walls; striker 512 size; striker 512 shape; striker 512 material; hardness (or elasticity) of the striker 512 and/or the casing 511; area of movement of the striker 512 within the casing 511 or other variable capable of changing one or both of volume and tonality of a sound generated by the striker 512 coming into contact with or moving against the casing 511.

In some embodiments, an audible generator 513 may be chosen according to expected preferences of a targeted fish for which the popping cork will be deployed. For example, a larger fish may be more attracted to a deeper tonality and a slower rhythm of sound to be generated; a smaller fish may be attracted to a higher pitch tonality and a faster rhythm of sound.

As used herein, an audible generator 513 is a device that produces a sound wave that is ascertainable by a fish. An audible generator may include, by way of non-limiting example, one or more of: a mechanical rattle, beads within a casing with enough area within the casing to strike one or both of other beads and the casing, beads that are axially strung and may strike each other, or a strike plate, a piezoelectric device, and an electric sound device.

In some embodiments, an audible generator includes a casing including a cylindrical casing 511 and one or more strikers 512 within the casing 511. The cylindrical casing 511 is closed at both ends 514, and encloses at least one striker 512 comprising a moveable insert, such as metallic ball bearing. The at least one striker 512 is roughly spherical, and has a diameter slightly smaller than the base diameter of the casing comprising a cylindrical casing 511. The at least one striker 512 can move freely within the tube to create a rattling sound when it impacts a closed end of the cylindrical casing 511 or another striker 512 such as another metallic ball bearing. The radial axis of the tube is approximately aligned with the hook axis 541 of the spoon. The radial axis of the tube is approximately aligned with the axis of the line 502.

The cork 500 may include a hard shell with a hollowed cylindrical-shaped area extending therethrough. This is desirable because the hard shell creates an acoustic chamber for an audible generator therein. In some embodiments, the cork 500 is made from Styrofoam. In other embodiments, the cork 500 is made from plastic. The cork 500 additionally comprises two eye rivets 503 on each end of the hollow cylinder. The eye rivets may be made of at least one of: steel, brass, metal, aluminum, or plastic.

A metal wire 502 passes through the cork 500 through the eye rivets 503 and forms an axis for the weighted popping flotation device. The cork 500 can move freely along the wire 502. Adjacent to the cork 500 on both axial sides thereof are a plurality of audible generators 504. In the embodiment shown in FIG. 1, the plurality of audible generators 504 comprise metallic ball bearings of non-uniform size. At least one audible generator on each side of the cork 500 can move freely along the wire 502. In some embodiments, it may be desirable to include an audible generator 506 that is significantly different from the audible generators 504 in size and weight, to generate different acoustic profiles. In a preferred embodiment, audible generator 506 comprises a lead weight, coated to prevent lead dust in a fisherman's tackle box. In a preferred embodiment, the audible generators 506 and 508 are chosen to ensure the entire weighted popping flotation device apparatus weighs between approximately 0.72 and 0.73 ounces.

On at least one axial end of the metal rod 502, is fixably attached a swivel 510. In some embodiments, the swivel 510 may be attached by heat shrink tubing 508. Heat shrink tubing 508 is desirable for its resistance to water and to avoid any snags on fishing line when setting the line.

Figure 6:
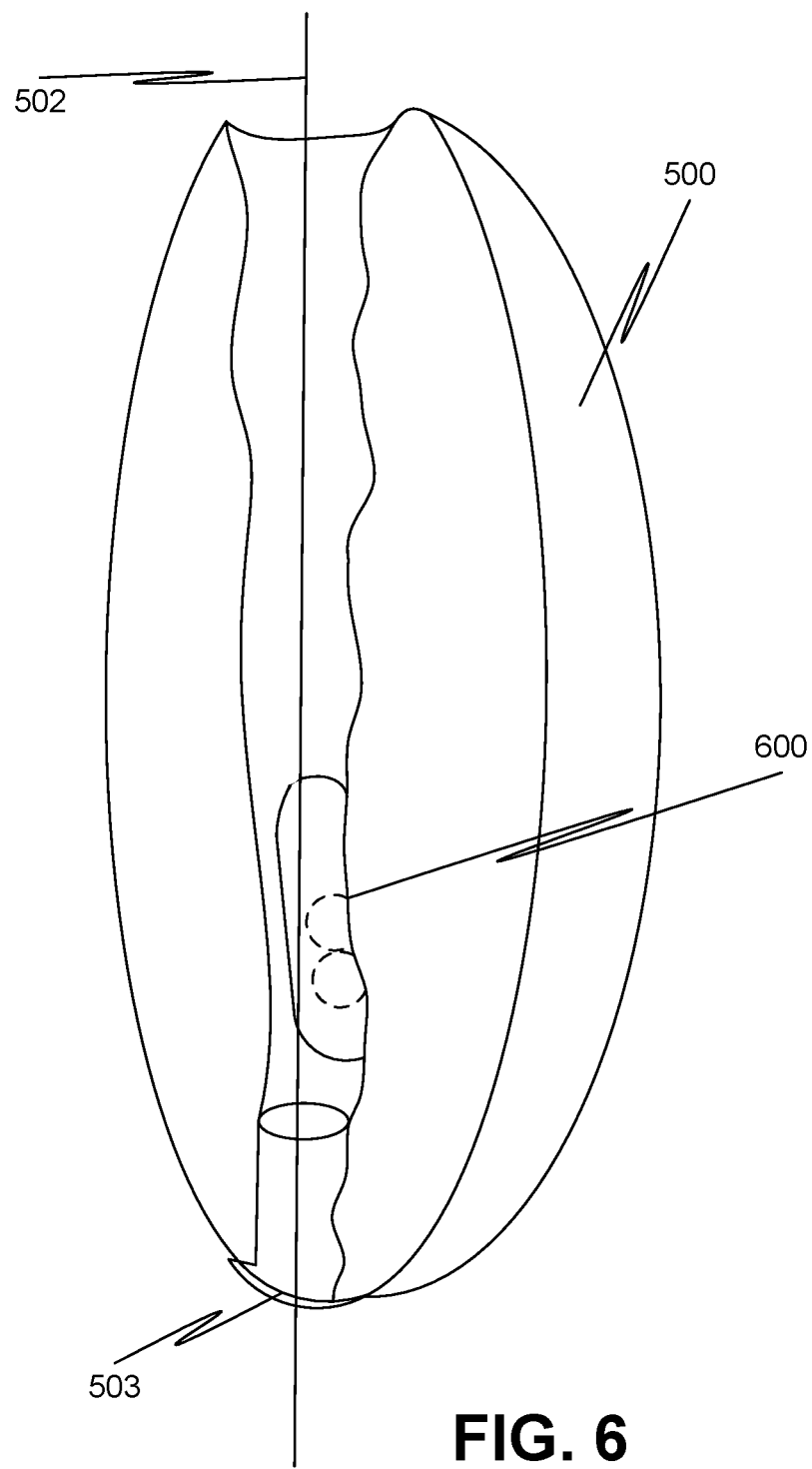
FIG. 6 illustrates an exemplary embodiment of a cross-section of a weighted popping flotation device.

Referring now to FIG. 6, a cross-section of the weighted popping flotation device 500 is shown with one eye rivet 503. Additionally, within the cylindrical hollowed-out area of the cork 500 an audible generator 600 is fixedly attached. In some embodiments, an audible generator 600 comprises a plurality of metallic ball bearings having a radius less than the radius of the hollowed-out area of the cork 500. In some embodiments, the ball bearings are contained within a cylindrical tube, creating a rattle, which rattle can in some embodiments move freely throughout the hollowed-out area of the cork 500. In such embodiments, the ball bearings generate noise through colliding with each other and with each end of the cylindrical tube. Because the cylindrical hollowed-out area of the cork 500 is bounded on each axial end by an eye rivet 503, in some embodiments the audible generator 600 can also generate noise by colliding with the eye rivet 503.

In other embodiments, the audible generator 600 is attached adhesively to the interior of the cork 500 and cannot move throughout. In some such embodiments, it may be desirable to attach the rattle in a central location within the cork. In other such embodiments, it may be desirable to adhesively attach the rattle closer to one eye 503 of the cork. In these embodiments, it is preferred to include as an audible generator 504 a different colored audible generator on one side of the wire 502, to aid the user in determining which on which side of the cork the audible generator 600 is attached.

Additional embodiments include a weighted popping flotation device with a scaled audible generator fixedly attached to one or both of a weighted portion and within a flotation portion.

Figure 7:
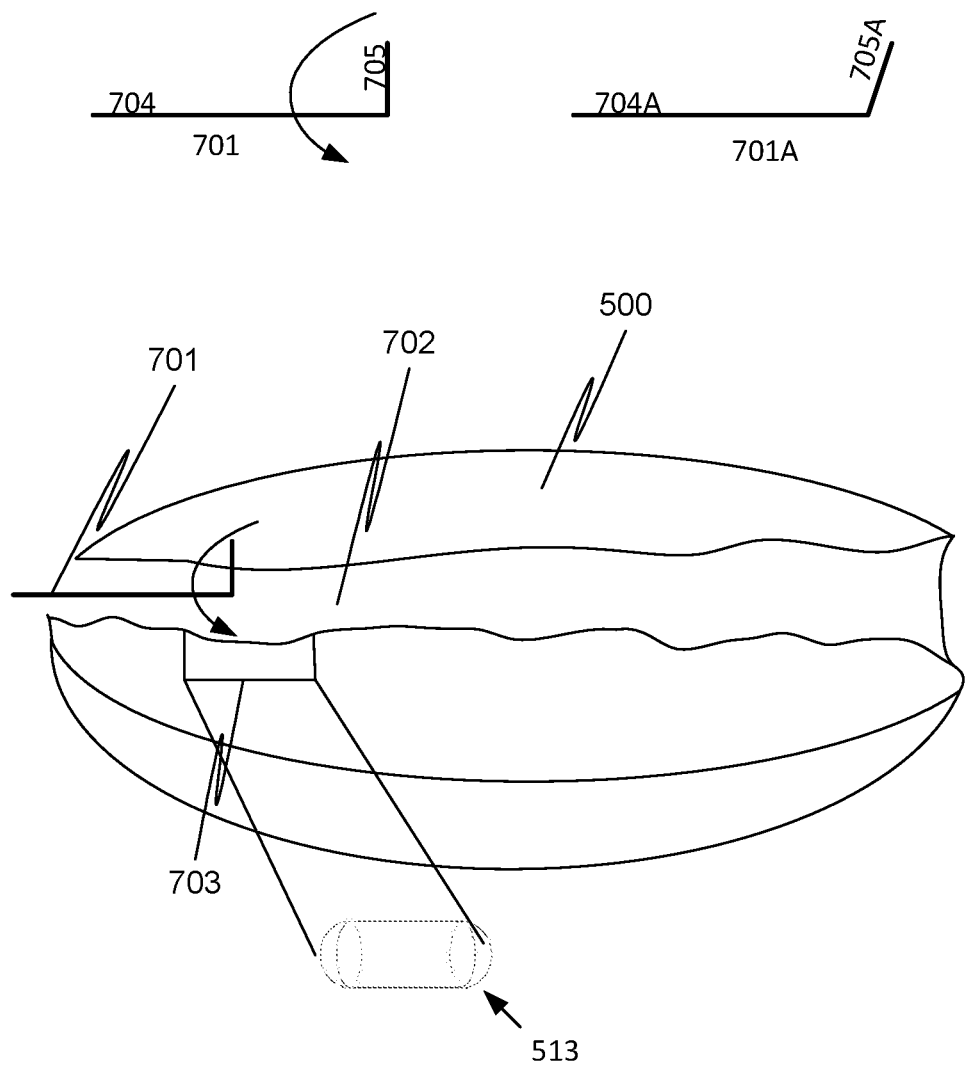
FIG. 7 illustrates an exemplary embodiment of a manufacture tool and cross-section of a weighted popping flotation device.

Referring now to FIG. 7, variations of tooling 701-701A useful for forming a cavity into a sidewall of a through via in a flotation material used to form a weighted popping flotation device is shown. The tooling 701-701A may include a first shaft 704-704A fixedly attached to, or formed into a single constituent with a second shaft 705-705A. The first shaft 704-704A is at an offset angle to the second shaft 705-705A. The angle may be a ninety (90) degree angle (such as illustrated at 701) or another angle, such as sixty (60) degrees or forty-five (45) degrees (such as illustrated in at 701A). As the tooling is inserted into a through via in the flotation material, rotation of the tooling may be used to remove some of the flotation material to form a cavity into which an audible generator may be placed. In some preferred embodiments, the rotation may be accomplished via a Dremel®, a drill or other motorized rotation tool.

Figure 8:
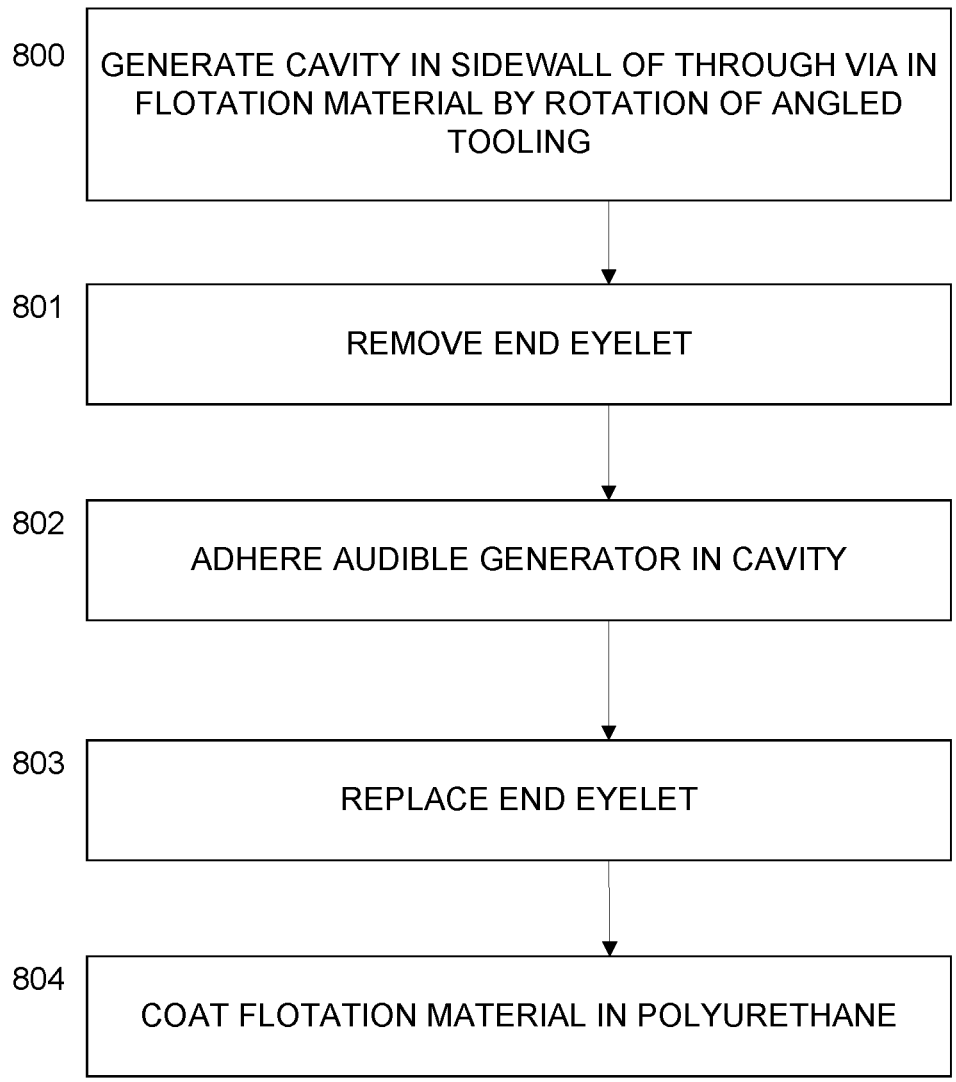
FIG. 8 illustrates an exemplary method for manufacturing a weighted popping flotation device.

Referring now to FIG. 8, a flowchart of exemplary method steps that may be used in constructing an audible flotation device 500 is shown. At 800, a hole is drilled into the cork 500 with a wire bit. In some embodiments, tooling, such as a wire bit with an angled shape, is rotated to generate a cavity into a sidewall of a through via in floatation material. In some embodiments, an axial hole may also be widened or created with the tooling. A cavity of suitable size and shape for holding an audible generator 600 may be created in a sidewall of the through via. At 801, if an eyelet is included in an end of the through via, the eyelet may be removed. At 802, the audible generator may be adhered into the cavity. Adherence may be accomplished via an adhesive, such as an epoxy, a thermal adhesive, a light activated adhesive, a silicone adhesive, caulking and the like.

At 803, a removed eyelet may be replaced, and at 804 a floatation material may be coated with a protective coating, such as, for example, by coating the flotation material with polyurethane. The coating may be applied via dipping, brushing, spraying and the like.

The flotation device 500 may be dipped into polyurethane in the flotation device's entirety, or piecewise. In a non-limiting example, the step described at 804 may be achieved by dipping a first portion of the floatation device, such as about one half of the volume of the floatation device, into polyurethane, allowing the dipped half to dry, then dipping the other half into polyurethane. The polyurethane is then allowed to dry. The polyurethane coating is desirable because it helps secure the audible generator 600 to the flotation material, secure the eyelet rivets 503 to the floatation material, and deters fish from eating the cork 500.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. An audibly enhanced fishing lure comprising:
   a lure spoon comprising a convex side, a concave side, a hole through the convex side to the concave surface side at a proximate end of the lure spoon, a hole through the convex side to the concave side at a mid-portion of the lure spoon, and a hole through the convex side to the concave side at a distal end of the lure spoon;
   a hook comprising a shank, a point and a fastening area, said fastening area fixedly attached to the hole at the mid-portion of the lure spoon with a fastener;
   an audible generator fixedly attached to the shank of the hook via a first heat shrink tube;
   a swivel with a proximate end and a distal end, said proximate end of the swivel attached to the hole at the distal end of the lure spoon; and
   a second shrink tube fixedly attaching the shank of the hook to the swivel at a portion of the hook positioned beyond the distal end of the lure spoon, thereby fixedly positioning the hook to extend from the hole at the mid-portion of the spoon to beyond the distal end of the spoon.

2. The audibly enhanced fishing lure of claim 1, wherein the fastener comprises a rivet.

3. The audibly enhanced fishing lure of claim 1, wherein the lure spoon additionally comprises a reflective surface on one or both of the convex side and the concave side.

4. The audibly enhanced fishing lure of claim 1, further comprising a reflective blade attached to the distal end of the swivel beyond the shank of the hook.

5. A method for assembling an audibly enhanced fishing lure, the method comprising the steps of:
   positioning a hook comprising a fastening area a barb and a shank on a concave side of a lure spoon, wherein the lure spoon additionally comprises a lure spoon comprising a convex side, a concave side, a hole through the convex side to the concave surface side at a proximate end of the lure spoon, a hole through the convex side to the concave side at a mid-portion of the lure spoon, and a hole through the convex side to the concave side at a distal end of the lure spoon, an audible generator fixedly attached to the shank of the hook via a first heat shrink tube, a swivel with a proximate end and a distal end, said proximate end of the swivel attached to the hole at the distal end of the lure spoon, and a second shrink tube fixedly attaching the shank of the hook to the swivel at a position of the hook beyond the distal end of the lure spoon thereby fixed positioning the hook to extend from the hole at the mid-portion of the spoon to beyond the distal end of the spoon;
fixedly attaching the hook to the hole at the mid-portion of the lure spoon;
placing an audible generator on the shank of the hook;
placing a first length of heat shrink tubing, in an expanded state, over the shank and the audible generator;
applying sufficient heat to the first length of heat shrink tubing to cause a diameter of first length of heat shrink tubing to reduce and fixedly attach the audible generator to the shank of the hook;
movably attaching a swivel comprising a proximate end and distal end to the distal end of the spoon; and
positioning a second length of heat shrink tubing, in an expanded state over a portion of the shank of the hook and the swivel; and
applying sufficient heat to the second length of heat shrink tubing to cause a diameter of the second length of heat shrink tubing to reduce and fixedly attach the shank of the lure to the swivel.

6. The method of claim 5, wherein the length of the hook from the proximate end to the distal end is between approximately 50% and approximately 200% of the length of the lure spoon.

7. The method of claim 5, wherein the hook further comprises an attachment loop.

8. The method of claim 7, wherein the hook is attached to the hole at the mid-portion of the lure spoon via the steps of fitting a rivet through the attachment loop and the hole at the mid-portion of the spoon and expanding a diameter of at least a portion of the rivet.

9. The method of claim 7, wherein the hook is attached to the hole at the mid-portion of the lure spoon by solder.

10. The method of claim 5, wherein the audible generator comprises a rattle assembly.

11. The method of claim 10, wherein the rattle assembly is fixedly attached to the shank of the hook with an adhesive.

12. The method of claim 10, wherein the rattle assembly is fixedly attached to the shank of the hook with a sealant.

13. The method of claim 5, further comprising the step of attaching a blade to a distal end of the swivel.

14. The method of claim 13, wherein the blade comprises a reflective metal.

15. The method of claim 13, wherein the blade is positioned to move proximate to a point at the end of the hook.

16. The method of claim 5, wherein the audible generator comprises a piezoelectric device.

17. The method of claim 5, wherein the audible generator comprises a strike plate.

18. The method of claim 5, wherein the audible generator comprises a plurality of beads.

19. The method of claim 5, wherein the audible generator comprises an electric sound device.

20. A method of attracting a fish to a fishing lure, the method comprising the steps of:
a. placing a lure in a body of water containing fish, the lure compromising:
a lure spoon comprising a convex side, a concave side, a hole through the convex side to the concave surface side at a proximate end of the lure spoon, a hole through the convex side to the concave side at a mid-portion of the lure spoon, and a hole through the convex side to the concave side at a distal end of the lure spoon, a hook comprising a shank, a point and a fastening area, said fastening area fixedly attached to the hole at the mid-portion of the lure spoon with a fastener, an audible generator fixedly attached to the shank of the hook via a first heat shrink tube, a swivel with a proximate end and a distal end, said proximate end of the swivel attached to the hole at the distal end of the lure spoon, a second shrink tube fixedly attaching the shank of the hook to the swivel at a portion of the hook positioned beyond the distal end of the lure spoon, thereby fixedly positioning the hook to extend from the hole at the mid-portion of the spoon to beyond the distal end of the spoon, and a reflective blade attached to the distal end of the swivel beyond the shank of the hook;
b. moving the lure through the water with a line fixedly attached to the proximate end of the lure spoon;
c. generating an underwater audible sound with the audible generator; and
d. generating a reflected pattern of light.

* * * * *